United States Patent [19]

Miller

[11] 4,087,515

[45] May 2, 1978

[54] PROCESS FOR THE PRODUCTION OF ALKALI METAL CHLORITES

[75] Inventor: J. Stanley Miller, North Haven, Conn.

[73] Assignee: Olin Corporation, New Haven, Conn.

[21] Appl. No.: 701,257

[22] Filed: Jun. 30, 1976

[51] Int. Cl.$^2$ ............................................. C01B 11/10
[52] U.S. Cl. ...................................... 423/472; 423/99; 423/102
[58] Field of Search ................... 423/472, 100, 99, 102

[56] References Cited

U.S. PATENT DOCUMENTS

| 2,926,996 | 3/1960 | Kooistra | 423/472 |
|---|---|---|---|
| 2,938,773 | 5/1960 | Kooistra | 423/472 X |
| 3,085,859 | 4/1963 | Scholten et al. | 423/100 |
| 3,101,248 | 8/1963 | Hirschberg | 423/472 |
| 3,749,761 | 7/1973 | Dean et al. | 423/99 |
| 3,769,205 | 10/1973 | Williams | 423/100 X |
| 3,847,598 | 11/1974 | Coulter et al. | 423/99 X |
| 3,857,704 | 12/1974 | Coulter | 423/99 X |
| 3,935,098 | 1/1976 | Oda et al. | 423/100 X |

FOREIGN PATENT DOCUMENTS

| 628,487 | 8/1949 | United Kingdom | 423/472 |
|---|---|---|---|

*Primary Examiner*—Edward Stern
*Attorney, Agent, or Firm*—James B. Haglind; Donald F. Clements; Thomas P. O'Day

[57] ABSTRACT

Alkali metal chlorites are produced by the reaction of chlorine dioxide with an alkali metal amalgam in a reaction mixture where the pH is maintained at from about 9.5 to about 11.5 by providing an excess of the alkali metal to the chlorine dioxide of at least 10 mole percent. Alkali metal chlorites obtained by this process are free of insoluble mercury and have reduced concentrations of soluble mercury as a contaminant.

11 Claims, No Drawings

PROCESS FOR THE PRODUCTION OF ALKALI METAL CHLORITES

This invention relates to a process for producing alkali metal chlorites. More particularly this invention relates to a process for producing alkali metal chlorites by the reaction of chlorine dioxide with an alkali metal amalgam. Alkali metal chlorites are employed as bleaching agents and in the purification of water.

It is known to produce alkali metal chlorites by reducing chlorine dioxide with alkali metal amalgams, as illustrated, for example, by U.S. Pat. No. 3,101,248, issued to R. E. Hirschberg et al. U.S. Pat. No. 3,101,248 teaches the reduction of an aqueous chlorine dioxide solution with alkali metal amalgams at a pH of from about 7.0 to about 9.0. The pH is maintained by the addition of a dilute strong inorganic acid. This process, however, produces an alkali metal chlorite product containing a high concentration of both insoluble and soluble mercury as an undesirable contaminant.

Sh. S. Shchegol reports the reduction of aqueous solutions of chlorine dioxide by sodium amalgam over a wide range of pH, for example, from about 5.3 to about 11.4 by the addition of a $Na_2HPO_4$ and $NaH_2PO_4$ buffer mixture. Shchegol was unable to obtain high yields of sodium chlorite at pH's above about 9.2 and in addition had added an undesirable contaminant, the buffer, which must be removed prior to commercial use of the sodium chlorite. [Trudy Khim i. Khim. Tekhnol. 1, No. 2, 357–63 (1958); Chem. Abstracts 54, 6377 f (1960)].

British Pat. No. 628,487 issued to Solvay & Cie, produces alkali metal chlorites by reacting chlorine dioxide with sodium amalgam where a slight excess, e.g. of the order of 5 percent, of amalgam is maintained in order to prevent the formation of mercuric oxide. The alkali metal chlorites produced by this process contain considerable amounts of dissolved mercury.

It is an object of the present invention to provide an improved process for the manufacture of alkali metal chlorites.

Another object of the invention is to provide an improved alkali metal chlorite process wherein the alkali metal chlorite is free of insoluble mercury and has reduced concentrations of soluble mercury as a contaminant.

An additional object of the present invention is to provide an improved process for alkali metal chlorites wherein the oxidation of mercury is minimized.

These and other objects of the invention are accomplished in a process for producing an alkali metal chlorite by the reaction of an alkali metal amalgam with chlorine dioxide in a reaction mixture which comprises maintaining the pH of said reaction mixture at from about 9.5 to about 11.5 by providing an excess of the alkali metal of said alkali metal amalgam to said chlorine dioxide of at least 10 mole percent, and recovering said alkali metal chloride produced.

Chlorine dioxide, which may be produced by any of several known methods, may be employed in the gas phase or it may be dissolved in a solvent such as water to form a solution, or it may be a mixture of gas and solution. In a preferred embodiment, chlorine dioxide gas is absorbed in water and supplied to the reaction mixture as an aqueous solution containing, for example, from about 2 to about 10 grams per liter of $ClO_2$.

Alkali metal amalgams, for example, sodium amalgam or potassium amalgam, are used where the concentration of the alkali metal in the amalgam is from about 0.001 to about 0.1, and preferably from about 0.005 to about 0.05 percent by weight of the alkali metal.

In a preferred embodiment of the process, chlorine dioxide in a liquid phase contacts the surface of the liquid alkali metal amalgam and the reactants are admixed at the interface to form a reaction mixture. In another embodiment, chlorine dioxide may be introduced as a gas with water being separately introduced to form a solution of chlorine dioxide at the interface with the alkali metal amalgam. The primary reaction is believed to take place according to the equation:

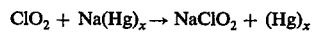

$$ClO_2 + Na(Hg)_x \rightarrow NaClO_2 + (Hg)_x$$

For carrying out the novel process of the present invention, the chlorine dioxide and the alkali metal amalgam are admixed to form a reaction mixture in which the pH of the reaction mixture is maintained at from about 9.5 to about 11.5, preferably from about 9.7 to about 10.8, and more preferably at from about 10.4 to about 10.8.

Maintenance of the above pH range is provided by supplying the reactants to the reaction mixture in such a manner that an excess of alkali metal in the alkali metal amalgam to the chlorine dioxide is at least 10 mole percent, and preferably an excess of alkali metal of from about 10 to about 20 mole percent is present.

Under these conditions, the formation of insoluble mercuric oxide in the reaction mixture is substantially prevented and the concentration of soluble mercury in the alkali metal chlorite product is substantially reduced.

During the reaction, it is desirable to agitate the reaction mixture to provide fresh amalgam at the reaction interface. This is preferably done by agitation means which provide a vertical motion to the body of amalgam.

Any suitable reaction temperature may be used, for example, temperatures in the range of from about 0° to about 35° C. Preferably, temperatures of from about 5° to about 15° C. may be employed.

It may be desirable to provide a gas such as nitrogen or argon which is inert to the reaction mixture to prevent high concentrations of chlorine dioxide gas from accumulating.

Alkali metal chlorites produced by the process are recovered preferably as aqueous solutions which can be employed directly or dried converted by known means to provide solid alkali metal chlorites.

Alkali metal chlorites produced by the novel process of the present invention contain dissolved mercury in moderate concentrations Where the alkali metal chlorite is to be used, for example, in the food processing industry it is necessary to reduce the content of dissolved mercury to a concentration of less than 1 part per million. To further reduce the mercury content, the alkali metal chlorite solution may be passed through or mixed with a mercury extraction agent such as charcoal or, for example, mixtures of ferric chloride and sodium sulfide. In a preferred embodiment, the pH of the alkali metal chlorite solution is raised to at least 12.0, for example, by the addition of an alkali metal hydroxide, prior to or during the treatment with the mercury extraction agent.

The process of the present invention is preferably carried out continuously with the alkali metal chlorite process being continuously withdrawn from the reaction mixture and the reactants being continuously fed to the reaction mixture.

The following example is presented to further illustrate the invention without any intention of being limited thereby. All parts and percentages are by weight unless otherwise specified.

EXAMPLE

A reactor was provided with inlets and outlets for amalgam and nitrogen gas, an inlet for an aqueous chlorine dioxide solution and an outlet for the alkali metal chlorite produced. In addition, the reactor was equipped with a pH electrode to measure the pH of the aqueous solution, a thermometer and an agitator for both the amalgam and the aqueous solution. A body of mercury was introduced into the reactor and above the mercury was continuously fed an aqueous solution containing 3–4 g/l of $ClO_2$ at a temperature of 4° C. Sodium amalgam having an Na content of 0.55 percent, was continuously pumped into the mercury body at a rate sufficient to maintain the pH of the aqueous solution at 10.5 ± 0.5 by providing an excess of Na to $ClO_2$ of about 15 mole percent. During the reaction the mercury body was agitated to produce a vertically circular motion to continuously provide fresh amalgam at the interface of the mercury body and the aqueous solution. Nitrogen gas was continuously fed to the reactor to prevent an excessive build-up of $ClO_2$. Spent amalgam was removed from the reactor as was an aqueous solution of sodium chlorite. The reaction temperature was maintained at about 10° C. The yield of $NaClO_2$, based on $ClO_2$, was 87.5 percent. The aqueous solution of sodium chlorite product, free of insoluble mercuric oxide, was treated with sufficient NaOH to raise the pH to 12, mixed with charcoal, and filtered to provide a purified aqueous sodium chlorite solution containing 0.06 ppm of dissolved mercury.

What is claimed is:

1. A process for producing an alkali metal chlorite having a low concentration of soluble mercury which comprises:
   a. admixing an alkali metal amalgam with chlorine dioxide and water at an interface to form a reaction mixture,
   b. maintaining said reaction mixture at a pH of from about 9.7 to about 10.8 by providing an excess of the alkali metal of said alkali metal amalgam to said chlorine dioxide in said reaction mixture of at least 10 mole percent,
   c. agitating said alkali metal amalgam to provide vertical movement to provide fresh amalgam at said interface, and
   d. separating an aqueous solution of said alkali metal chlorite from said reaction mixture.

2. The process of claim 1 in which said chlorine dioxide in said reaction mixture is an aqueous solution of chlorine dioxide.

3. The process of claim 2 in which said alkali metal is sodium.

4. The process of claim 3 in which said sodium amalgam contains from about 0.001 to about 0.1 percent by weight of sodium.

5. The process of claim 4 in which said aqueous solution of chlorine dioxide contains from about 2 to about 10 grams per liter of $ClO_2$.

6. The process of claim 5 in which said excess of said sodium in said sodium amalgam to said chlorine dioxide in said reaction mixture is from at least 10 to about 20 mole percent.

7. The process of claim 6 in which a gas inert to said reaction mixture is provided to said reaction mixture.

8. A process for the removal of soluble mercury from an aqueous solution of an alkali metal chlorite produced by the reaction of an alkali metal amalgam with chlorine dioxide which comprises:
   a. admixing said aqueous solution with an alkaline agent to provide an alkaline aqueous solution of said alkali metal chlorite having a pH of at least 12.0,
   b. admixing said alkaline aqueous solution with a mercury extracting material to extract said soluble mercury, and
   c. separating said alkaline aqueous solution from said mercury extracting material.

9. The process of claim 8 in which said mercury extracting material is charcoal.

10. A process for producing an alkali metal chlorite having a low concentration of soluble mercury which comprises:
    a. admixing an alkali metal amalgam with an aqueous solution of chlorine dioxide at an interface to form a reaction mixture,
    b. maintaining said reaction mixture at a pH of from about 9.5 to about 11.5,
    c. agitating said alkali metal amalgam to provide vertical movement to provide fresh amalgam at said interface,
    d. separating an aqueous solution of said alkali metal chlorite from said reaction mixture,
    e. treating said aqueous solution of alkali metal chlorite to maintain the pH of said aqueous solution at least 12.0,
    f. contacting said aqueous solution of alkali metal chlorite with a mercury extracting material to remove said soluble mercury, and
    g. separating said aqueous solution of alkali metal chlorite from said mercury extracting material.

11. The process of claim 10 in which said mercury extracting material is charcoal.

* * * * *